(12) United States Patent
Wheeler

(10) Patent No.: US 6,530,731 B2
(45) Date of Patent: Mar. 11, 2003

(54) SELF-TAPPING INSERT, INSERT ASSEMBLY, AND METHOD FOR MOUNTING THE INSERT

(75) Inventor: Fredric J. Wheeler, Lima, OH (US)

(73) Assignee: General Dynamics Land Systems, Inc., Sterling Heights, MI (US)

( * ) Notice: Subject to any disclaimer, the term of this patent is extended or adjusted under 35 U.S.C. 154(b) by 134 days.

(21) Appl. No.: 09/775,709

(22) Filed: Feb. 1, 2001

(65) Prior Publication Data

US 2002/0102146 A1 Aug. 1, 2002

(51) Int. Cl.[7] ............. F16B 35/00; F16B 37/12
(52) U.S. Cl. .......... 411/178; 411/107; 411/386; 411/389; 411/418; 29/525.11
(58) Field of Search ............. 411/108, 109, 411/178, 386, 389, 418, 420, 107; 29/525.11

(56) References Cited

U.S. PATENT DOCUMENTS

| | | | |
|---|---|---|---|
| 2,886,090 A | * | 5/1959 | Rosan ............... 411/109 |
| 3,789,725 A | | 2/1974 | Lindstrom |
| 3,942,406 A | | 3/1976 | Egner |
| 4,003,287 A | | 1/1977 | Ziaylek, Jr. |
| 4,223,585 A | * | 9/1980 | Barth et al. ........... 411/389 |
| 4,334,815 A | * | 6/1982 | Knohl ............. 411/389 X |
| 4,449,874 A | | 5/1984 | McKinney |
| 4,611,093 A | * | 9/1986 | Farmer et al. ....... 411/389 X |
| 4,673,323 A | | 6/1987 | Russo |
| 4,854,311 A | * | 8/1989 | Steffee ............. 411/389 X |
| 5,000,639 A | | 3/1991 | Hinkley et al. |
| 5,071,301 A | | 12/1991 | Engelhardt et al. |
| 5,211,520 A | | 5/1993 | McKinney |

* cited by examiner

*Primary Examiner*—Neill Wilson
(74) *Attorney, Agent, or Firm*—Brooks & Kushman P.C.

(57) ABSTRACT

A self-tapping threaded insert (20) for threadedly mounting another component by a threaded central connector (50). An assembly (24) of the insert (20) and a mounting member (22) for threadedly mounting the insert are assembled by a method for mounting the self-tapping threaded insert. The insert (20) has a threaded shank (26) that is threaded into a partially tapped hole and has a shank end with flutes (32) of a construction that provides self-tapping. Upon final torquing, a locking flange (42) of the insert (20) locks against a surface (46) of the member (22) as threads of the insert shank (26) are completely engaged with the hole.

8 Claims, 4 Drawing Sheets

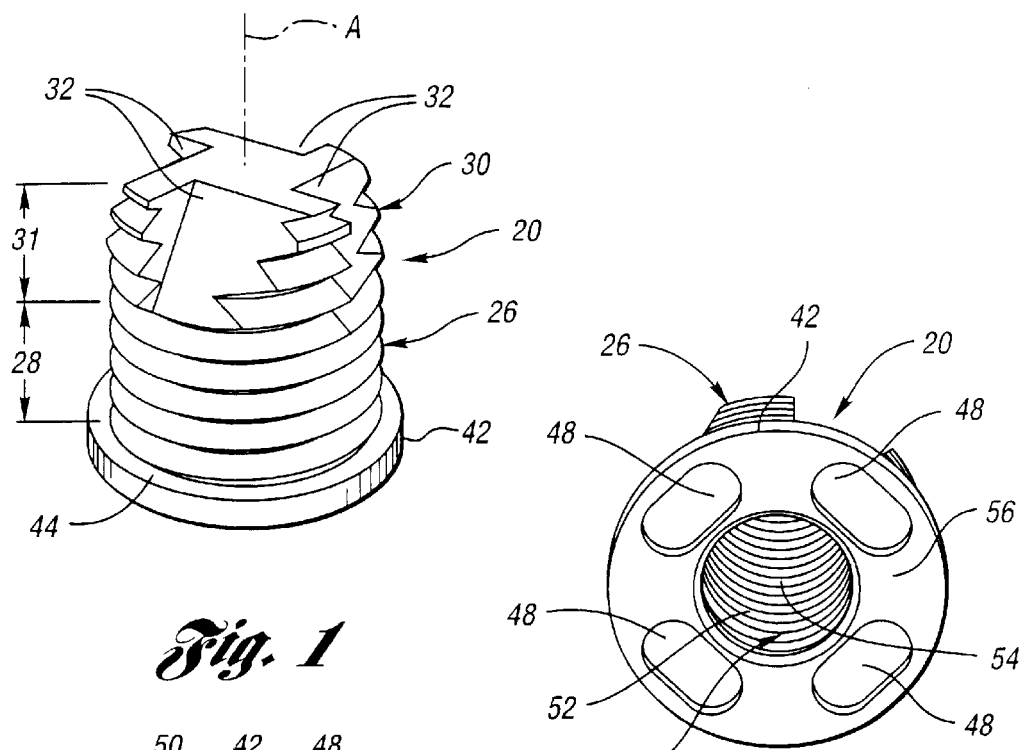
*Fig. 1*
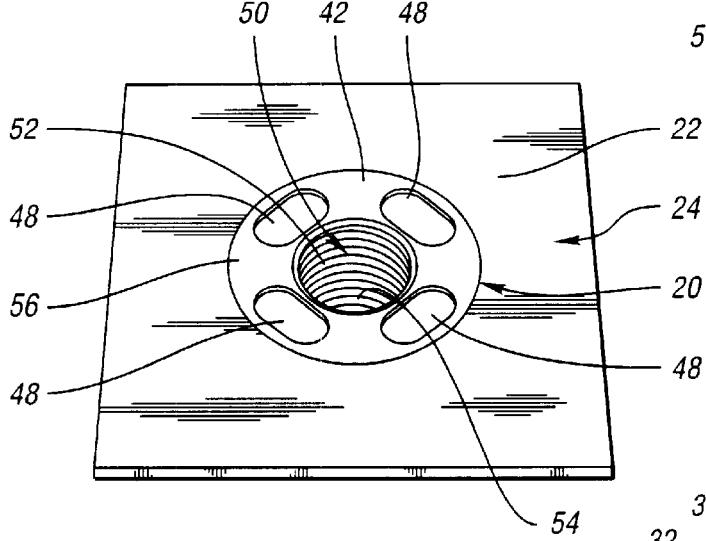
*Fig. 3*
*Fig. 2*
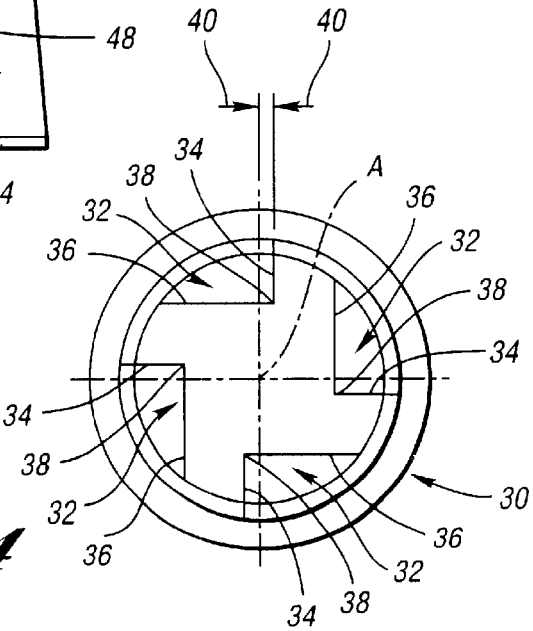
*Fig. 4*

SELF-TAPPING INSERT, INSERT ASSEMBLY, AND METHOD FOR MOUNTING THE INSERT

BACKGROUND OF THE INVENTION

1. Field of the Invention

This invention relates to a self-tapping threaded insert for use in mounting another component on a member on which the insert is mounted, to an insert assembly of the insert and the member on which it is mounted, and to a method for mounting the insert on the member.

2. Background Art

One way in which components are mounted on a member in industrial assembly utilizes a threaded insert that is threaded into the member and has a threaded connector on which another threaded component can be mounted by threading. Such a construction permits mounting and removal of the component as may be required for maintenance, repair or replacement.

Prior art references noted during an investigation in connection with the present invention include U.S. Pat. Nos.: 3,789,725 Lindstrom; 3,942,406 Egner; 4,003,287 Ziaylek, Jr.; 4,449,874 McKinney; 4,673,323 Russo; 5,000,639 Hinkley et al.; 5,071,301 Engelhardt et al.; and 5,211,520 McKinney.

SUMMARY OF THE INVENTION

An object of the present invention is to provide an improved self-tapping threaded insert for use in mounting another component on a member on which the insert is mounted.

In carrying out the above object, the insert of the invention includes a threaded shank that has a central axis and a uniform diameter thread as well as having a tapered end with a tapered thread. The tapered end of the threaded shank has at least two circumferentially spaced flutes that extend to and terminate at the uniform diameter thread of the threaded shank. Each flute has a pair of flat surfaces extending perpendicular to each other and having a junction that extends angularly to the central axis of the threaded shank. A locking flange of the insert extends outwardly from the threaded shank and has a locking surface that faces toward the tapered end of the shank to provide locking against an opposed surface of the member on which the insert is mounted. The locking flange has drive surfaces for providing torquing of the insert for mounting and removal. A central connector of the insert extends from the locking flange and has a thread for securing another component to the insert and the member on which it is mounted.

In the preferred construction, the tapered end of the threaded shank has four circumferentially spaced flutes that extend to and terminate at the uniform diameter of the threaded shank. Each of the four flutes has a pair of flat surfaces extending perpendicular to each other and having a junction that extends angularly to the central axis of the threaded shank.

In one preferred embodiment of the self-tapping threaded insert, the central connector is a threaded hole that extends within the threaded shank toward the tapered end of the threaded shank. This embodiment has the locking flange provided with a drive face in which the drive surfaces are located, and the drive face is oriented in the opposite direction as the locking surface of the locking flange.

In another preferred embodiment of the self-tapping threaded insert, the central connector is a threaded stud that extends from the locking flange along the central axis away from the threaded shank. This embodiment has the drive surfaces of the locking flange facing radially outward from the central axis axially between the threaded shank and the threaded stud.

Another object of the present invention is to provide an improved insert assembly.

In carrying out the immediately preceding object, the improved insert assembly of the invention includes a member having a surface through which a partially tapped hole extends. The partially tapped hole has a uniform diameter thread with a plurality of turns and also has a tapered thread that extends from the uniform diameter thread. A self-tapping threaded insert of the assembly has a threaded shank with a central axis and a uniform diameter thread with more turns and of a slightly larger diameter than the uniform diameter of the partially tapped hole so as to have full engagement therewith upon threading into the partially threaded hole. The threaded shank has a tapered thread that extends from its uniform diameter thread. The tapered end of the threaded shank has at least two circumferentially spaced flutes that extend to and terminate at the uniform diameter thread of the threaded shank, and each flute has a pair of flat surfaces extending perpendicular to each other and having a junction that extends angularly to the central axis of the threaded shank. The insert has a locking flange that extends outwardly from the threaded shank. This locking flange has a locking surface that faces toward the tapered end of the shank to provide locking against the surface of the member as the insert is threaded into the partially threaded hole. The locking flange has drive surfaces for providing torquing of the insert for mounting on and removal from the member. The insert also has a central connector that extends from the locking flange and has a thread for securing another component to the insert and the member on which it is mounted.

Another object of the present invention is to provide an improved method for mounting a self-tapping threaded insert.

In carrying out the immediately preceding object, the method for mounting a self-tapping threaded insert in accordance with the invention is performed by partially tapping a hole through a surface in a member such that the hole has a uniform diameter thread with a plurality of turns and also has a tapered thread that extends from the uniform diameter thread. A tapered end of a threaded shank of a self-tapping threaded insert is inserted into the partially tapped hole with the tapered end of the insert having at least two circumferentially spaced flutes that extend to and terminate at a uniform diameter of the threaded shank and with each flute having a pair of flat surfaces that extend perpendicular to each other and have a junction that extends angularly to a central axis of the threaded shank. The insert is threaded into the partially tapped hole such that the uniform diameter thread of the shank, which has more turns and is of a slightly larger diameter than the uniform diameter of the partially tapped hole, and the tapered end of the threaded shank are completely engaged with the hole. The insert is torqued at drive surfaces of a locking flange of the insert such that a locking surface of the locking flange locks against the surface of the insert as the insert is fully threaded into the hole to mount the insert with a central connector thereof extending from the locking flange and having a thread for securing another component to the insert and the member on which it is mounted.

The objects, features and advantages of the present invention are readily apparent from the following detailed description of the best modes for carrying out the invention when taken in connection with the accompanying drawings.

BRIEF DESCRIPTION OF THE DRAWINGS

FIG. 1 is a perspective view of a self-tapping threaded insert constructed in accordance with the invention and illustrates a threaded shank of the insert.

FIG. 2 is another perspective view of the self-tapping threaded insert taken generally from the opposite direction as FIG. 1 to illustrate a locking flange and drive surfaces thereof utilized in mounting the insert as well as illustrating a central connector embodied by a threaded hole that is used to mount another component on the insert and the member on which it is mounted.

FIG. 3 is a perspective view illustrating an insert assembly and shown with the insert mounted on a member of the assembly.

FIG. 4 is an axial end view that illustrates circumferentially spaced flutes of the threaded shank of the insert.

DETAILED DESCRIPTION OF THE PREFERRED EMBODIMENTS

Figure 5:
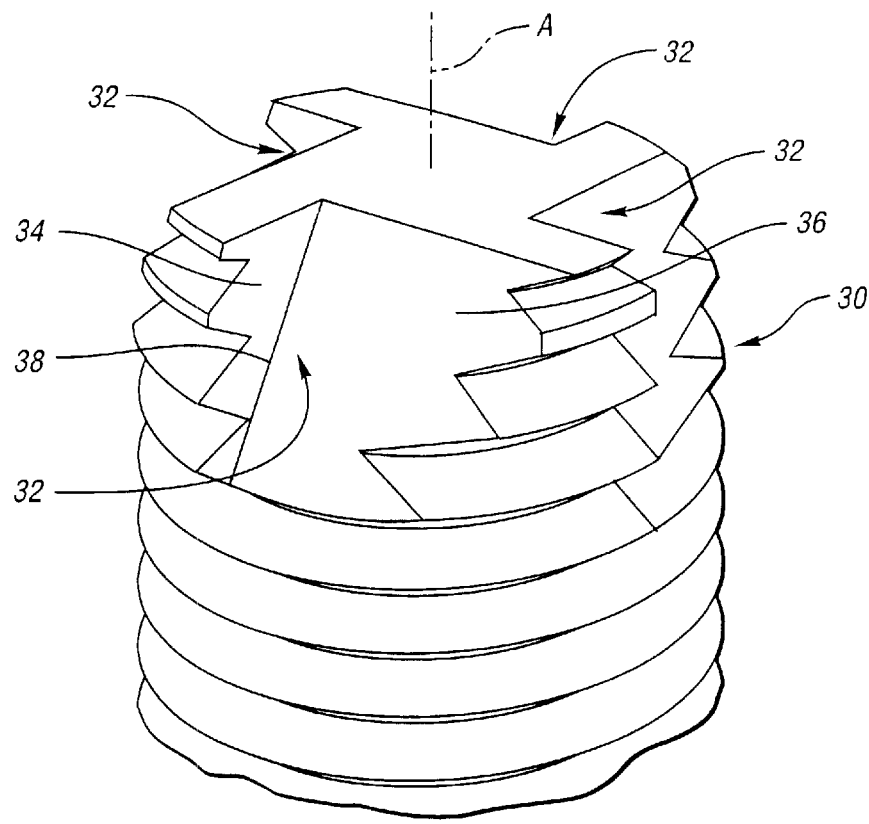
FIG. 5 is a perspective view taken on an enlarged scale from FIG. 1 to further illustrate the construction of the circumferentially spaced flutes.

With reference to FIGS. 1–3, one embodiment of a self-tapping threaded insert is indicated generally by 20 and is constructed for threaded mounting on a member 22 shown in FIG. 3 with the mounting being performed in a manner that is hereinafter more fully described. The insert 20 has particular utility when made from titanium or stainless steel and when utilized to provide mounting on an aluminum member; however, the insert can also find use when made from other materials for threaded mounting on members of other metals and materials. The member 22 and the self-tapping threaded insert 20 cooperatively provide an insert assembly 24 of the invention. The method for mounting the insert 20 on the member 22 is another aspect of the invention that is hereinafter more fully described. The self-tapping threaded insert 20, the insert assembly 24 and the method for mounting the insert are described below in an integrated manner to facilitate an understanding of all aspects of the invention.

With reference to FIG. 1, the self-tapping threaded insert 20 includes a threaded shank 26 with a central axis A and including a uniform diameter thread 28 as well as including a tapered end 30 having a tapered thread 31. The tapered end 30 of the threaded shank 26 has at least two circumferentially spaced flutes 32 and, actually has four of the circumferentially spaced flutes in the preferred construction. The flutes 32 of the tapered end 30 of the shank extend to and terminate at the uniform diameter thread 28 of the threaded shank.

As illustrated in FIGS. 4 and 5, each of the flutes 32 has a pair of flat surfaces 34 and 36 extending perpendicular to each other and having a junction 38 that extends angularly to the central axis of the threaded shank. As illustrated in FIG. 4, the one flat surface 34 has a spaced and generally parallel relationship to a radial plane through the central axis A with the spacing illustrated by arrows 40. This construction provides the flutes with greater capacity for chip storage upon tapping into a hole as is hereinafter more fully described.

As shown in FIGS. 1 and 2, the insert 20 also has a locking flange 42 that extends outwardly from the threaded shank 26 and has a locking surface 44 (FIG. 1) that faces toward the tapered end of the shank to provide locking against an opposed surface 46 (FIG. 8) of the member 20 on which the insert is mounted in a manner that is hereinafter more fully described. The locking flange 42 as shown in FIG. 2 also has drive surfaces 48 for providing torquing of the insert for mounting and removal. A central connector 50 of the insert extends from the locking flange 42 and has a thread 52 for securing another component to the insert and the member 24 on which it is mounted.

Figure 8:
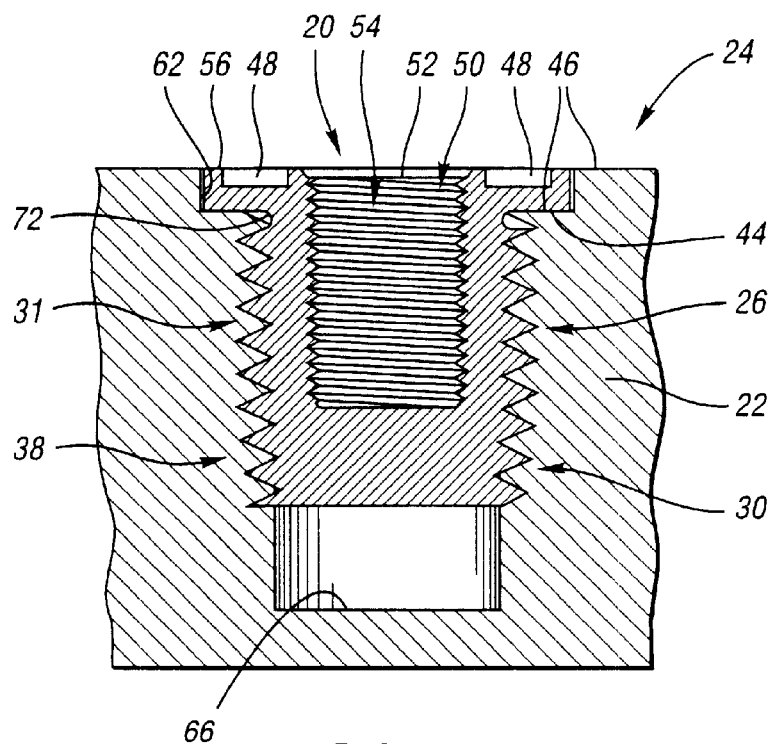
FIG. 8 is a sectional view taken in the same direction as FIGS. 6 and 7 and illustrates the insert assembly with the insert fully threaded into the hole so as to be mounted on the member in a manner that permits mounting of another component on the member.

As previously mentioned, the tapered end 30 of the threaded shank 26 preferably has four of the circumferentially spaced flutes 32 with the perpendicular flat surfaces 34 and 36 and junction 38 as previously described extending to and terminating at the uniform diameter thread 28 of the threaded shank. In the embodiment illustrated in FIGS. 1–3, the central connector 50 as best illustrated in FIG. 8 is embodied by a threaded hole 54 that extends within the threaded shank 26 toward the tapered end 30 of the threaded shank. This threaded hole 54 allows attachment of another male threaded component to the insert 20 and the member 22 on which it is mounted as illustrated. In this embodiment, the locking flange 42 has a drive face 56 in which the drive surfaces 48 of the locking flange are located. This drive face 56 is oriented in the oppositely facing direction as the locking surface 44 of the locking flange 42 and is thus accessible by a suitably configured tool to engage the drive surfaces 48 and provide torquing for mounting and removal of the threaded insert as necessary.

Figure 9:
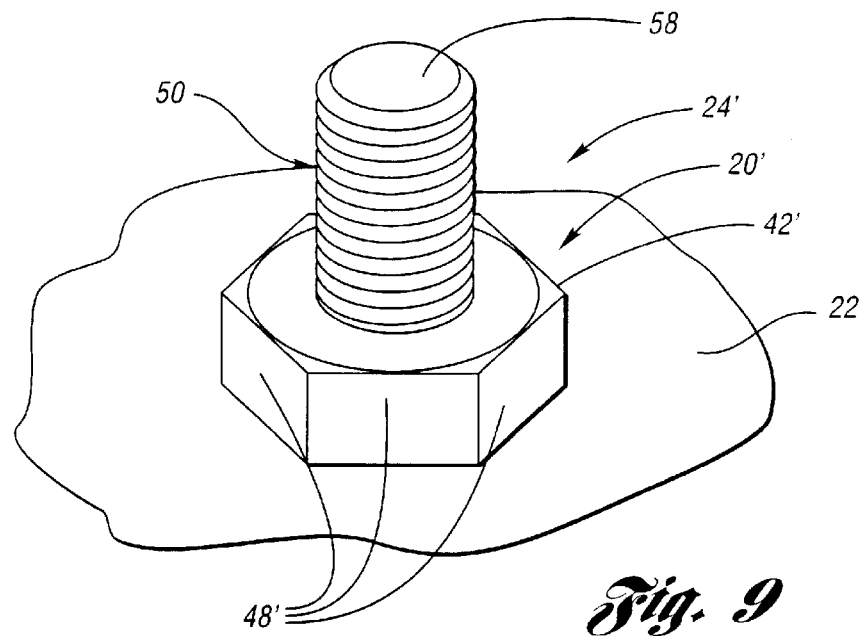
FIG. 9 is a perspective view illustrating another embodiment of the threaded insert wherein the central connector is embodied by a threaded stud as opposed to the threaded hole illustrated in the embodiment of FIGS. 1 and 2.

With reference to FIG. 9, another embodiment of the self-tapping threaded insert is indicated generally by 20' and has a threaded shank of the same construction previously described in connection with FIGS. 1–5 and 8. However, in this embodiment, the central connector 50 is a threaded stud that extends from the locking flange 42' along the central axis A away from the unshown threaded shank which, as previously mentioned, has the same construction as the threaded shank of the previously described embodiment. The drive surfaces 48' of the locking flange 42' face radially outward from the central axis A axially between the threaded shank and the threaded stud 58 and have a hexagonal configuration by which torquing for mounting and removal can be performed by a conventional wrench.

Figure 6:
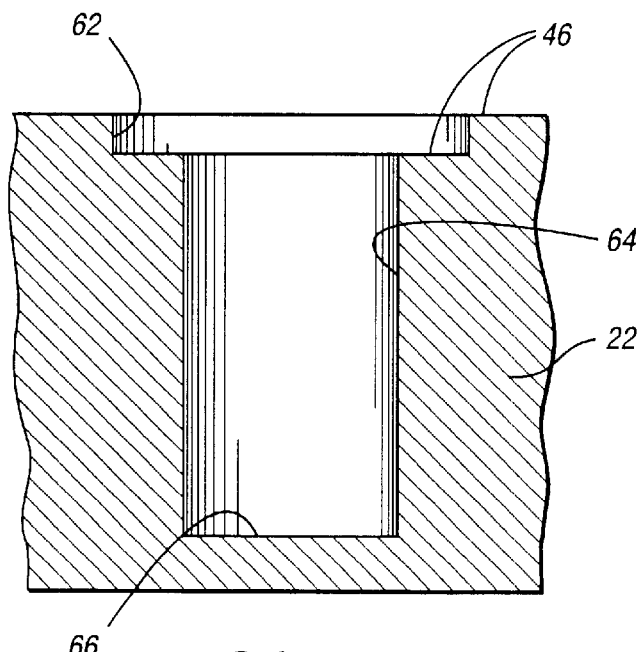
FIG. 6 is a sectional view taken through a member on which the insert is to be mounted within a hole thereof that is illustrated prior to partial tapping of the hole.
Figure 7:
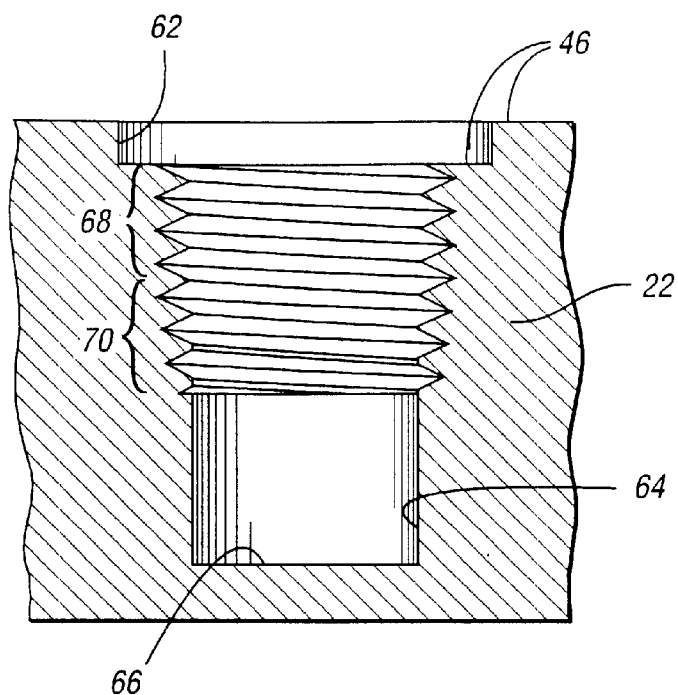
FIG. 7 is a sectional view similar to FIG. 6 but shown at a later stage after the hole has been partially tapped with a uniform diameter thread having a plurality of terns and with a tapered thread that extends from the uniform diameter thread.

The insert assembly 24 of the invention will now be described with reference initially to FIG. 6 which shows the member 22 on which the insert is to be mounted. This member 22 includes the surface 46 against which the locking flange of the threaded insert locks as previously described. More specifically, the surface 46 as illustrated includes a recess 62 so that the locking flange and the insert can be flush mounted as illustrated in FIG. 3. A hole 64 shown in FIG. 6 extends through the surface 46 and has a blind bottom 66 that is illustrated as being flat although it would also be possible for the hole bottom to have a conical shape provided by conventional drilling if there is sufficient thickness of the member 22. The hole 64 is then partially tapped as illustrated in FIG. 7 so as to have a uniform diameter thread 68 with a plurality of turns and to also have a tapered thread 70 that extends from the uniform diameter thread 68 toward the hole bottom 66.

The self-tapping threaded insert 20 illustrated in FIG. 1 then has its tapered end 30 inserted into the partially tapped hole 64. This tapered end 30 of the insert as previously described has the circumferentially spaced flutes 32 of the construction previously described. The threaded insert 20 is threaded into the partially tapped hole such that its uniform diameter thread 28, which has more turns and is of a slightly larger diameter than the uniform diameter thread 68 of the partially tapped hole, and the tapered end of the thread shank are completely engaged with the hole as illustrated in FIG. 8. More specifically, the larger uniform diameter thread 28 will have a major diameter about 1 to 4% larger than the major diameter of the hole thread 68. For example, if the partially tapped hole 64 shown in FIG. 7 has its uniform diameter thread 68 provided with a nominal major diameter of 0.500 inch, the nominal major diameter of the uniform diameter thread 28 of the insert will be on the order of about 0.505 to 0.520 of an inch. This construction ensures that the uniform diameter thread 28 of the insert 20 as well as its cutting tapered end 30 are fully engaged with the hole after threading to the assembled position of FIG. 8.

The last assembly step of the insert 20 in the member 22 involves torquing the insert at its drive surfaces 26 such that the locking surface 44 of the locking flange 42 locks against the surface 46 of the member 22 as the insert is fully threaded into the hole to mount the insert with its central connector 50 extending from the locking flange with the connector thread 52 for securing another component to the insert and the member on which it is mounted. The tapered end 30 of the insert with its flutes 32 provides self threading of the insert from the condition of the partially tapped hole shown in FIG. 7 to the fully tapped position of FIG. 8 with chips generated being received within the flutes whose size is sufficient to receive the chip generated by the self-tapping. The full engagement of the insert thread with the member also provides a fluid tight connection in cooperation with the fluid tight seal provided by the locking flange 42 with the member surface 46 in an annular shape. It will be noted that the insert shank includes an annular recess 72 (FIG. 8) adjacent the locking surface 44 of the locking flange 42 to ensure that there is no interference between the shank and the locking flange as the insert is torqued into its final position.

Figure 10:
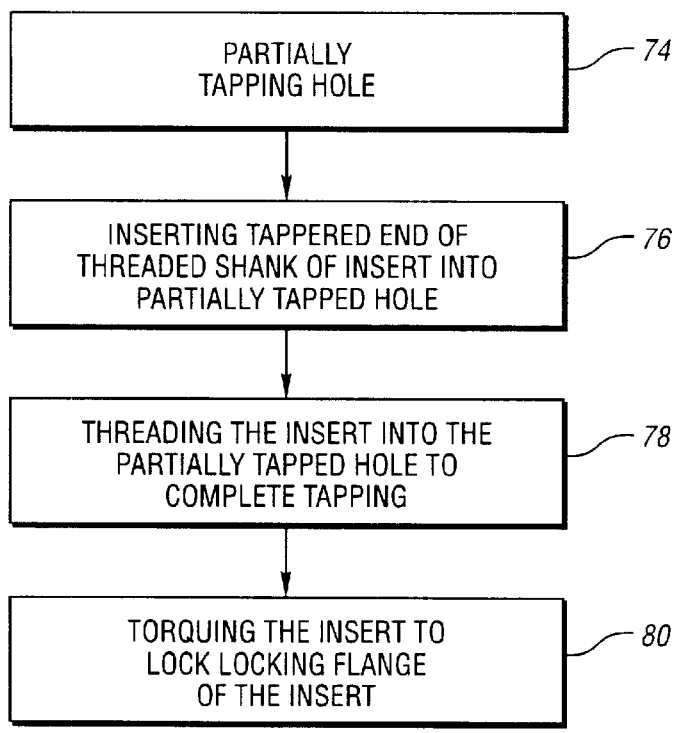
FIG. 10 is a block diagram illustrating the steps involved in the method for mounting the self-tapping threaded insert.

With reference to FIG. 10, the insert assembly method is illustrated as beginning with the step 74 of partially tapping the hole followed by the step 76 of inserting the tapered end of the threaded shank of the insert into the partially tapped hole prior to the step 78 of threading the insert into the partially tapped hole to complete the tapping before the final step 80 of torquing the insert to lock the locking flange of the insert against the member as described above.

While the best modes for carrying out the invention have been described in detail, those familiar with the art to which the invention relates will recognize other ways of practicing the invention as defined by the following claims.

What is claimed is:

1. A self-tapping threaded insert comprising:
   a threaded shank with a central axis and including a uniform diameter thread as well as including a tapered end having a tapered thread;
   the tapered end of the threaded shank having at least two circumferentially spaced flutes that extend to and terminate at the uniform diameter thread of the threaded shank, and each flute having a pair of flat surfaces extending perpendicular to each other and having a junction that extends angularly to the central axis of the threaded shank;
   a locking flange that extends outwardly from the threaded shank and has a locking surface that faces toward the tapered end of the shank to provide locking against an opposed surface of a member on which the insert is mounted, and the locking flange having drive surfaces for providing torquing of the insert for mounting and removal; and
   a central connector that extends from the locking flange and has a thread for securing another component to the insert and the member on which it is mounted.

2. A self-tapping threaded insert as in claim 1 wherein the tapered end of the threaded shank has four circumferentially spaced flutes that extend to and terminate at the uniform diameter thread of the threaded shank, and each of the four flutes having a pair of flat surfaces extending perpendicular to each other and having a junction that extends angularly to the central axis of the threaded shank.

3. A self-tapping threaded insert as in claim 1 or 2 wherein central connector comprises a threaded hole that extends within the threaded shank toward the tapered end of the threaded shank.

4. A self-tapping threaded insert as in claim 3 wherein the locking flange includes a drive face in which the drive surfaces are located, and the drive face being oriented in the opposite direction as the locking surface of the locking flange.

5. A self-tapping threaded insert as in claim 1 or 2 wherein the central connector comprises a threaded stud that extends from the locking flange along the central axis away from the threaded shank.

6. A self-tapping threaded insert as in claim 5 wherein the drive surfaces of the locking flange face radially outward from the central axis axially between the threaded shank and the threaded stud.

7. An insert assembly comprising:
   a member having a surface through which a partially tapped hole extends, the partially tapped hole having a uniform diameter thread with a plurality of turns and also having a tapered thread that extends from the uniform diameter thread;
   a self-tapping threaded insert having a threaded shank with a central axis and including a uniform diameter thread with more turns and of a slightly larger diameter than the uniform diameter thread of the partially tapped hole so as to have fully engagement therewith upon threading into the partially threaded hole, and the threaded shank having a tapered thread that extends from its uniform diameter thread;
   the tapered end of the threaded shank having at least two circumferentially spaced flutes that extend to and terminate at the uniform diameter thread of the threaded shank, and each flute having a pair of flat surfaces extending perpendicular to each other and having a junction that extends angularly to the central axis of the threaded shank;

the insert having a locking flange that extends outwardly from the threaded shank, the locking flange having a locking surface that faces toward the tapered end of the shank to provide locking against the surface of the member as the insert is threaded into the partially threaded hole, and the locking flange having drive surfaces for providing torquing of the insert for mounting on and removal from the member; and the insert having a central connector that extends from the locking flange and has a thread for securing another component to the insert and the member on which it is mounted.

8. A method for mounting a self-tapping threaded insert comprising:

partially tapping a hole through a surface in a member such that the hole has a uniform diameter thread with a plurality of turns and also has a tapered thread that extends from the uniform diameter thread;

inserting a tapered end of a threaded shank of a self-tapping threaded insert into the partially tapped hole with the tapered end of the insert having at least two circumferentially spaced flutes that extend to and terminate at a uniform diameter thread of the threaded shank and with each flute having a pair of flat surfaces that extend perpendicular to each other and have a junction that extends angularly to a central axis of the threaded shank;

threading the insert into the partially tapped hole such that the uniform diameter thread of the shank, which has more turns and is of a slightly larger diameter than the uniform diameter thread of the partially tapped hole, and the tapered end of the threaded shank are completely engaged with the hole; and torquing the insert at drive surfaces of a locking flange of the insert such that a locking surface of the locking flange locks against the surface of the member as the insert is fully threaded into the hole to mount the insert with a central connector thereof extending from the locking flange and having a thread for securing another component to the insert and the member on which it is mounted.

* * * * *